United States Patent [19]

Mori et al.

[11] 4,083,602
[45] Apr. 11, 1978

[54] WEBBING GUIDE FOR A SEAT BELT

[75] Inventors: Mamoru Mori, Okazaki; Shiro Sasaki, Toyota; Sadao Hachisuka, Anjyo, all of Japan

[73] Assignee: Toyota Jidosha Kogyo Kabushiki Kaisha, Toyoto, Japan

[21] Appl. No.: 769,702

[22] Filed: Feb. 17, 1977

[30] Foreign Application Priority Data

Mar. 4, 1976    Japan ................. 51-25553[U]

[51] Int. Cl.² .......................................... B60N 1/02
[52] U.S. Cl. ................................................ 297/389
[58] Field of Search ............... 280/744, 747, 745; 297/384, 389, 385, 216; 24/182

[56] References Cited

U.S. PATENT DOCUMENTS

| | | | |
|---|---|---|---|
| 2,495,029 | 1/1950 | Spengler | 24/182 X |
| 3,136,579 | 6/1964 | Hunter | 297/385 X |
| 3,230,009 | 1/1966 | Schmidt et al. | 24/182 |
| 3,547,489 | 12/1970 | Grieser | 297/385 |
| 3,606,457 | 9/1971 | Reay | 297/216 |
| 3,915,495 | 10/1975 | Oehm | 280/747 |

FOREIGN PATENT DOCUMENTS 2,327,547   12/1973   Germany ..................... 297/389

OTHER PUBLICATIONS

Japanese Utility Model 48-4624 (46324/73).
Japanese Utility Model 49-67316 (67316/74).

*Primary Examiner*—James T. McCall
*Attorney, Agent, or Firm*—Stevens, Davis, Miller & Mosher

[57] ABSTRACT

A webbing guide for use with a three-point seat belt comprising a lug member mounted to a rear side end portion of a seat so as to hold a tongue plate provided at an intermediate mounting portion of the webbing of the seat belt when the seat belt is not used and to guide one end of a lap belt portion of the seat belt when it is worn by a man sitting on the seat.

10 Claims, 8 Drawing Figures

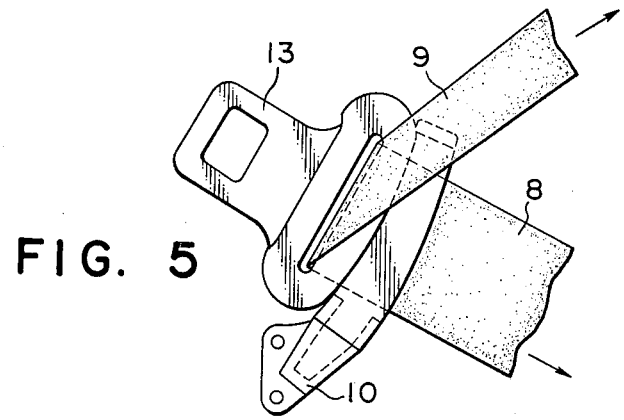
FIG. 5
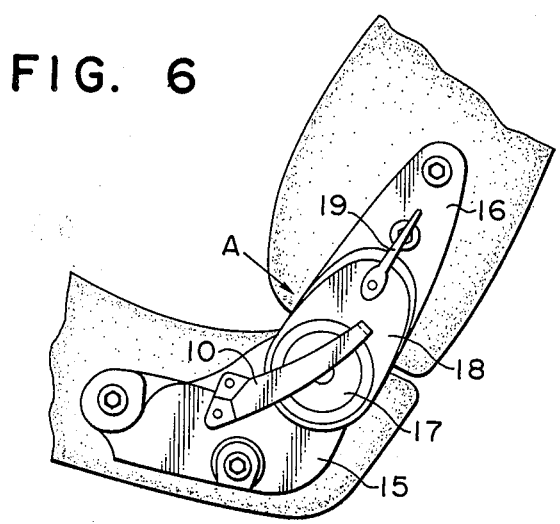
FIG. 6
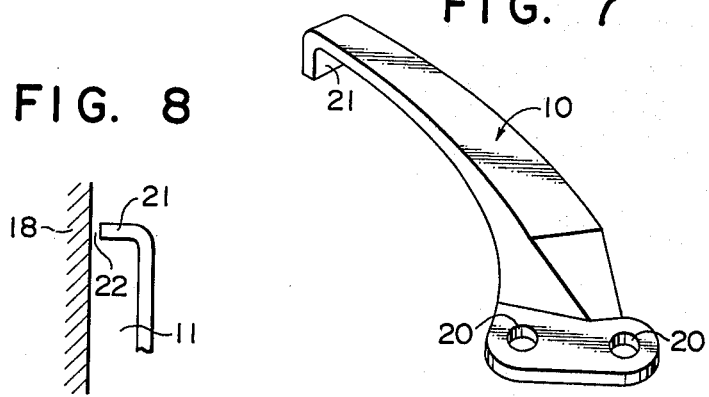
FIG. 7
FIG. 8

WEBBING GUIDE FOR A SEAT BELT

BACKGROUND OF THE INVENTION

1. Field of the Invention

The present invention relates to a seat belt in automobiles and, more particularly, a webbing guide for guiding a webbing of a seat belt mounted in automobiles.

2. Description of the Prior Art

As a kind of a seat belt mounted in automobiles, a three-point seat belt is known, said seat belt having a first end mounted to a lower structural member such as a floor frame located on one side of a seat, a second end mounted to an upper structural member such as a roof frame and an intermediate mounting portion adapted to be selectively mounted to a lower structural member located on the other side of the seat so as to selectively hold the lap or waist and shoulder portions of a man sitting on the seat. When the three-point seat belt is mounted in an automobile, particularly the two door type automobile, the lower mounting end for said first end of the seat belt is positioned substantially rearward of the seat (this means a front seat here and hereinunder) so that the convenience of passengers getting in and out of the rear seat is ensured. In this seat belt structure, when the seat belt is not used, the belt or its webbing is expanded or suspended to extend from its upper end or said second end to its lower end or said first end. Therefore, when a man who is seated on the seat wants to wear the seat belt, he must stretch his arm rearward for a substantial length to catch said intermediate mounting portion. This operation is rather difficult and troublesome and is likely to discourage a passenger from wearing the seat belt.

SUMMARY OF THE INVENTION

It is therefore the object of the present invention to deal with the aforementioned problem related the three-point seat belt and to provide a means which makes the wearing of the seat belt easier and still more maintains a desirable wearing condition of the seat belt when in use.

In accordance with the present invention, the above-mentioned object is accomplished by a webbing guide for use with a three-point seat belt which comprises a first end mounted to a lower structural member located on one side of a seat, a second end mounted to an upper structural member and an intermediate mounting portion adapted to be selectively mounted to a lower structural member located on the other side of said seat so as to selectively hold the waist and shoulder portions of a man sitting on said seat, said webbing guide comprising a lug member mounted to a rear side end portion of said seat, said lug member defining an opening through which a webbing of said seat belt extending between said first end and said intermediate mounting portion is passed in a manner to be slidably guided.

The three-point seat belt may comprise a first webbing which extends from said first end mounted to the lower structural member by a retractor or an anchor plate to a tongue plate provided at said intermediate mounting portion and is called a lap belt and a second separate webbing which extends from said tongue plate to said second end mounted to said upper structural member and is called a shoulder belt or, alternatively the three-point seat belt may comprise a single webbing which extends from said first end mounted to said lower structural member by a retractor or an anchor plate to said second end mounted to said upper structural member by way of an intermediate portion where it engages a tongue plate forming said intermediate mounting portion so that the single webbing provides both a lap belt portion extending from said first end to said tongue plate and a shoulder belt portion extending from said tongue plate to said second end when the seat belt is worn by a passenger. In either structure of the three-point belt, by providing a webbing guide of the aforementioned structure, when the seat belt is not used, the intermediate mounting portion or the tongue plate is always positioned at a rear side end portion of the seat and, when the seat belt is brought to a wearing position starting from the unused condition, the webbing guide operates to guide a webbing portion which forms the lap belt portion in a desirable manner such that the lap belt portion is neatly adjusted at the lap or waist portion of the passenger.

BRIEF DESCRIPTION OF THE DRAWING

In the accompanying drawing,

FIGS. 4 and 5 are enlarged side views showing the engagement of the webbing guide and the tongue plate shown in FIGS. 2 and 3, respectively;

FIG. 6 is a side view of an embodiment of the webbing guide of the present invention incorporated in a seat reclining structure;

FIG. 7 is a perspective view showing an embodiment of the lug member which forms the webbing guide; and, FIG. 8 is a view along arrow A in FIG. 6, showing a tip end portion of the lug member.

DESCRIPTION OF THE PREFERRED EMBODIMENT

Figure 1:
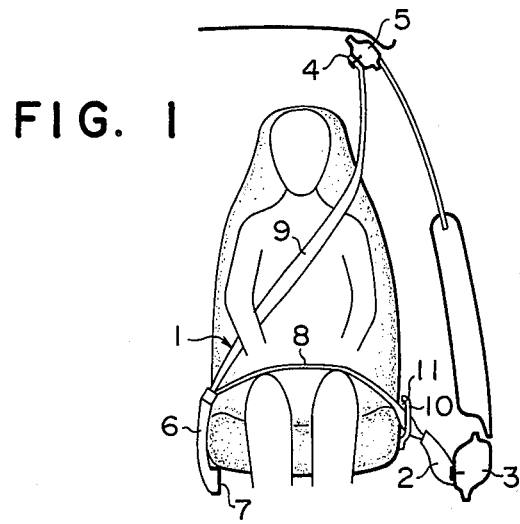
FIG. 1 is a front view of a seat with a passenger being seated on it and with an example of the three-point seat belt being mounted to hold the passenger, wherein the webbing guide of the present invention is incorporated.

In the following the invention will be described in more detail with reference to the accompanying drawing. As shown in FIG. 1, a three-point seat belt generally indicated by reference 1 has a webbing which has a first end 2 mounted to a lower structural member 3 such as a floor frame located on one side of the seat by a mounting means such as retractor, anchor plate or the like, a second end 4 mounted to an upper structural member 5 such as a roof frame and an intermediate mounting portion 6 adapted to be selectively mounted to a lower structure member 7 located on the other side of the seat, wherein a part of the webbing forms a lap belt 8 extending from said first end 2 to said intermediate end portion 6 while the other part forms a shoulder belt 9 extending from said intermediate mounting portion 6 to said second end 4. 10 designates the webbing guide for the seat belt provided in accordance with the present invention. The webbing guide 10 defines a guide opening 11 through which the webbing extending from the end 2 to the intermediate mounting portion 6 is passed.

Figures 2, 3:
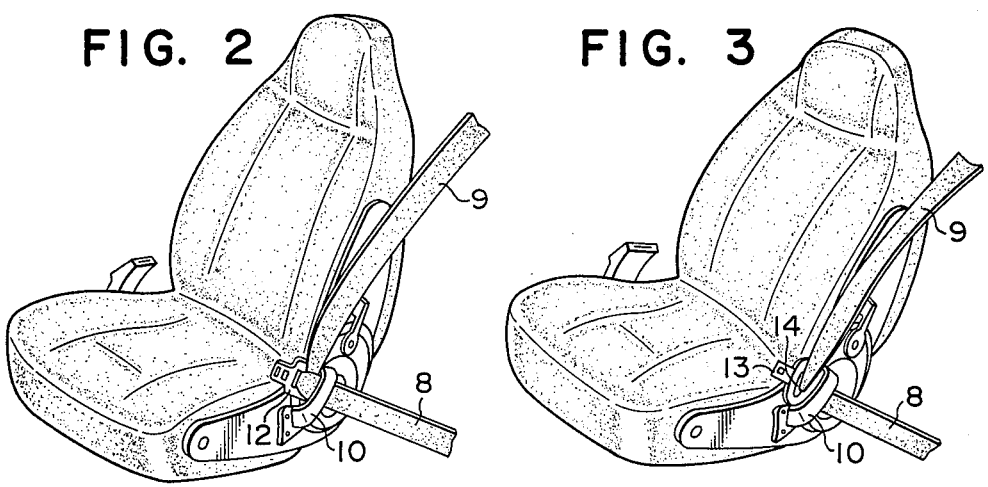
FIGS. 2 and 3 are perspective views showing two different three-point seat belts arranged for use with a seat, wherein the seat belts are shown in an unused condition.
Figure 4:
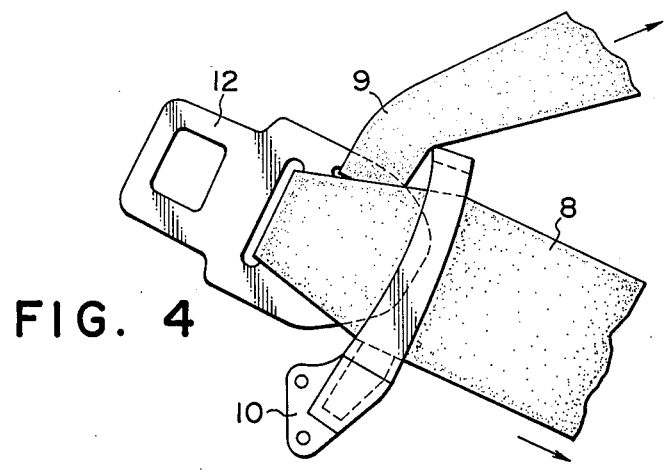

FIG. 2 shows an embodiment of the webbing guide of the present invention incorporated in a left side seat equipped with a three-point seat belt. In this case, the seat belt has individual webbings for the lap belt 8 and the shoulder belt 9, these two webbings being connected to a tongue plate 12 forming a part of the intermediate mounting portion 6. FIG. 3 shows a view similar to FIG. 2. However, in this case the seat belt has a single webbing which forms an integral lap belt 8 and shoulder belt 9, said webbing being passed through an opening 14 of a tongue plate 13 at a middle portion thereof. In either belt structure shown in FIGS. 2 or 3, when the seat belt is not used, the tongue plate 12 or 13 is automatically engaged onto the webbing guide 10 by such an operation that the webbing extending from said first end to said tongue plate is guided by the webbing guide 10. FIGS. 4 and 5 show a manner of engagement of the tongue plate and the webbing guide on an enlarged scale.

FIG. 6 shows a relatively detailed structure of a rear side end portion of a seat where the webbing guide 10 is incorporated. As shown in the figure, the rear side end portion of a two door type automobile seat incorporates therein a pivot structure for reclining a seat back. The pivot structure includes a base plate 15 mounted to a seat member and a seat back plate 16 mounted to a seat back member, these two plates being connected by a pivot shaft 17 with each other. The pivot structure incorporates an angle adjusting mechanism called a recling adjustor 18, the adjustment of which is effected by a reclining adjustor lever 19.

The webbing guide of the present invention may be formed by a lug member of a cantilever type as shown in FIG. 7, the cantilever member having a root portion formed with openings 20 for receiving mounting screws which fasten the roof portion to, for example, the base plate 15 as shown in FIG. 6. As shown in FIG. 7, the lug member for forming the webbing guide 10 has a laterally projected portion 21 at its free end portion, said laterally projected portion serving to define an opening 11 for guiding the webbing while it also serves to define a clearance 22 having a dimension a little larger than the thickness of the webbing shown in FIGS. 1 or 8. Since the opening 11 is defined by a peripheral member which leaves the slit clearance 22, the webbing guide 10 may be mounted beforehand to a rear side end portion of a seat so that the webbing is thereafter mounted to the opening 11 through the slit opening 22. By this arrangement the mounting process of the seat belt is much easier. From FIGS. 2, 3 and 6 it will be apparent that the webbing guide 10 does not interfere at all with the reclining operation of the seat.

From the foregoing, it will be appreciated that a three-point seat belt is in its unused condition guided by the webbing guide of the present invention in a manner such that its tongue plate forming an intermediate mounting portion of the webbing is automatically held at a predetermined rear side end portion of the seat thereby substantially facilitating the belt wearing operation in its initial stage and that when the three-point seat belt is worn by a man who sits on the seat, the webbing guide operates to guide an end of the lap belt portion 8 in a manner such that the lap belt portion is desirably arranged on the lap or waist portion of the man.

Although the invention has been explained with reference to a particular embodiment thereof, it will be understood by those skilled in the art that various modifications can be made with respect to the shown embodiment without departing from the spirit of the invention.

We claim:

1. A three-point seat belt for an automobile having a seat and upper and lower structural members located on a first side of said seat, comprising a webbing having first and second ends, a first webbing end mounting means mounted to said lower structural member and holding said first end of said webbing, a second webbing end mounting means mounted to said upper structural member and holding said second end of said webbing, a tongue plate connected with an intermediate portion of said webbing, a tongue plate holding means located at a rear side end portion of said seat on a second side thereof which is opposite to said first side and adapted to selectively hold said tongue plate, and a lug mounted to a rear side end portion of said seat on said first side and defining an opening for guiding said webbing therethrough at a portion thereof extending between said first end and said intermediate portion connected with said tongue plate.

2. The seat belt of claim 1, wherein said webbing includes first and second webbing elements, said first webbing element providing the webbing portion extending between said first webbing end mounting means and said tongue plate while said second webbing element provides the webbing portion extending between said webbing end mounting means and said tongue plate.

3. The seat belt of claim 1, wherein said seat is of a reclining type having a base plate and a seat back plate pivoted with each other and mounted to a side portion of the seat, said lug being a cantilever member having a root portion fastened to said base plate, a main portion extending substantially parallel to said base and seat back plates and a free end portion projecting laterally toward said seat back plate while leaving a clearance between the free end and said seat back plate, said clearance being just wide enough to pass said webbing therethrough, said lug and said base and seat back plates cooperating to define the opening for guiding said webbing while said main portion of said lug provides a bar means for blocking and holding said tongue plate in engagement therewith.

4. The webbing guide of claim 1, wherein said lug member is a cantilever member having a root portion where it is fastened to said rear side end portion of said seat.

5. The webbing guide of claim 4, wherein said cantilever member has a free end spaced from said rear side end portion of said seat thereby defining a slit clearance therebetween for passing the webbing of the belt therethrough.

6. The webbing guide of claim 4, wherein said cantilever member has a laterally projecting portion at its free end portion.

7. The webbing guide of claim 1, wherein said lug member is mounted to a base plate of a pivot structure for reclining a seat back.

8. The webbing guide of claim 5, wherein said lug member is a cantilever member having a root portion fastened to said base plate and a free end portion located adjacent a seat back plate of said pivot structure.

9. The webbing guide of claim 1, wherein said opening defined by said lug member is so dimensioned that it prevents passing through of a tongue plate mounted to said seat belt.

10. The webbing guide of claim 1, wherein said lug member is mounted in an inclined manner such that it traverses substantially perpendicularly a part of said seat belt extending from said first end to said lug member.

* * * * *